(12) United States Patent
Barber

(10) Patent No.: US 6,223,372 B1
(45) Date of Patent: May 1, 2001

(54) COMBINATION CARABINER AND TOOL DEVICE

(76) Inventor: Launce R. Barber, 624 Gibson Dr., Vienna, VA (US) 22180

( * ) Notice: Subject to any disclaimer, the term of this patent is extended or adjusted under 35 U.S.C. 154(b) by 0 days.

(21) Appl. No.: 09/365,747

(22) Filed: Aug. 3, 1999

Related U.S. Application Data
(60) Provisional application No. 60/095,842, filed on Aug. 7, 1998.

(51) Int. Cl.$^7$ .................................................. B25B 11/00
(52) U.S. Cl. .................................................. 7/118; 7/158
(58) Field of Search .............................. 7/118, 104, 138, 7/151, 156, 158, 161, 167, 168, 170

(56) References Cited

U.S. PATENT DOCUMENTS

| | | | |
|---|---|---|---|
| 964,558 | * 7/1910 | Rose | 7/118 |
| 1,039,260 | * 9/1912 | Cooper | 7/118 |
| 1,187,842 | 6/1916 | Kaas . | |
| 1,635,649 | * 7/1927 | Tillmanns | 7/118 |
| 2,430,638 | * 11/1947 | Hoffman | 7/118 |
| 4,122,569 | 10/1978 | Hitchcock . | |
| 4,363,147 | * 12/1982 | Deweese | 7/158 |
| 5,212,844 | 5/1993 | Sessions et al. . | |
| 5,270,909 | 12/1993 | Weiss et al. . | |
| 5,329,675 | 7/1994 | McLean et al. . | |
| 5,442,855 | * 8/1995 | Jobin | 30/161 |
| 5,463,798 | * 11/1995 | Wurzer | 24/599.5 |
| 5,553,340 | 9/1996 | Brown, Jr. . | |
| 5,581,834 | * 12/1996 | Collins | 7/118 |
| 5,727,319 | * 3/1998 | Myerchine et al. | 30/123 |
| 5,983,686 | * 11/1999 | Lee | 70/456 R |

FOREIGN PATENT DOCUMENTS

| | | |
|---|---|---|
| 0 619 167 A1 | 3/1994 | (EP) . |
| 9237 | of 1896 | (GB) . |
| 106956 | 3/1943 | (SE) . |

* cited by examiner

*Primary Examiner*—James G. Smith
*Assistant Examiner*—Hadi Shakeri
(74) *Attorney, Agent, or Firm*—Richard C. Litman

(57) ABSTRACT

A combination carabiner and tool device comprises a curvilinear handle and a lockable gate to form a loop. In the handle is a folding knife and additional useful tools at both ends. A push button lock releasably holds the knife blade in the blade open position. The knife blade is pivoted into position and releasably locked by manipulation with the user's thumb.

10 Claims, 3 Drawing Sheets

COMBINATION CARABINER AND TOOL DEVICE

CROSS-REFERENCE TO RELATED APPLICATION

This application claims the benefit of U.S. Provisional Patent Application Serial No. 60/095,842, filed Aug. 7, 1998.

BACKGROUND OF THE INVENTION

1. Field of the Invention

The present invention relates generally to a carabiner combined with at least one useful folding tool. More specifically, the invention is directed to locking or nonlocking carabiners that are used in combination with ropes by mountaineers to provide useful tools which are predominately folded into the device such as a knife, a saw, a can opener, Phillips or flat head screwdrivers, a bottle cap opener, a saw, an Allen wrench, a claw-shaped ripping hook, a pair of pliers, and a pair of scissors.

2. Description of the Related Art

Carabiners are well known for their utility and safety to people engaged in mountaineering and rock climbing. Carabiners are a type of fastener used to attach rope or to restrain or restrict climbing ropes in their movement. The carabiner is generally a metallic loop made up of a body in the form of a hook or C-shaped of which the rear, the straight, and the central portions are extended by curved loops, one at the top and one at the bottom, the free ends of which are connected, to close the loop by a gate. The gate is pivotally mounted to permit passage of rope into the loop and lockable to ensure the rope remains in place in the loop.

Although conceptually not complex, carabiners have been the object of improvements by generations of experienced users to extend their utility and to improve their safety. The related art of interest will be discussed in the order of perceived relevance to the present invention.

U.S. Pat. No. 5,270,909 issued on Dec. 14, 1993, to Richard S. Weiss et al. describes an openable carabiner-type handle attachment for a 6-volt battery equipped flashlight or a mug. The lock is spring-loaded and totally dissimilar in structure to the lock of the present invention. There is neither a suggestion or a teaching that a combination of folding tools can be substituted for the battery or mug to be carried.

U.S. Pat. No. 5,329,675 issued on Jul. 19, 1994, to Andrew McLean et al. describes a carabiner with a thumb grip. The thumb grip is attached as a fin or rib extending from the loop. A person's thumb may rest on the thumb grip, thereby contacting the loop in a particularly handy position. This allows a person to orient or feel the carabiner during use. The carabiner device is distinguishable for not including any tools.

U.S. Pat. No. 4,122,569 issued on Oct. 31, 1978, to Thomas H. Hitchcock describes an integrated universal tool comprising a crescent wrench having its handle formed in parallel rails to contain three blades which are kept from pivoting out by a sliding keeper. The middle blade is a knife with a saw tooth edge at one end, a V-shaped notch in the middle, a curved recess shear blade and a crimping pin proximate the opposite end, and a flat blade screwdriver at the opposite end. One sideward blade comprises a flat blade screwdriver at one end, a cooperating V-shaped notch for stripping sheathed wires, a crimping wire notch proximate the opposite end, and a cooperating curved shear blade at the opposite end. The other sideward blade comprises a Phillips screw-driver at one end, a crimping notch, and a curved shear blade at the opposite end. The combination tool is distinguishable for its linear construction of the slotted crescent wrench handle and a sliding keeper.

European Patent Application No. E.P.O. 0 619 167 A1 published on Mar. 19, 1994, for Carl V. Elsener, Sr. describes a Swiss folding blade knife and tool combination. The device comprises a handle into which fold a knife blade, a Phillips screwdriver, two combination bottle cap openers and flat head screwdrivers, and other elongated tools not describable. The combination knife and tool combination device is distinguishable as having a non-loop U.S. Pat. No. 1,187,842 issued on Jun. 20, 1916, to Eilef Kaas describes a combination tool comprising a pair of detachable side flanges removable by press-buttons and containing two saws, a gimlet, a file, a button lock, a bodkin, a corkscrew, a punch, a screwdriver, a can opener, a tape measure and pointer, a knife, and a combination nail and brush hinged from an arm containing an ear spoon. The multiple tool is distinguishable for its non-loop structure.

U.S. Pat. No. 5,122,844 issued on May 25, 1993, to George C. Sessions et al. describes a pocket tool with retractable pliers jaws, cutting jaws or scissors and a pair of channel-shaped handles. The pivotally mounted ancillary tools include a knife blade, a serrated blade, a pair of scissors, a bottle opener, a pointed shaft, a flat head screwdriver, and a lanyard receiving hole. The pocket tool is distinguishable for its folding structure.

U.S. Pat. No. 5,553,340 issued on Sep. 10, 1996, to James D. Brown, Jr. describes a utility tool for making adjustments or repairs of a power chain saw. A hexagonal socket is present on the closed end of a cylindrical case member. The opposite open end has a loop and tunnels for a file, a flat head screwdriver and a pair of tweezers. A slot holds a pivoting slide member which contains other pivoting out tools such as a Phillips screwdriver, a star wrench, a flat head screwdriver, a knife blade, a second knife blade with a scooped end, and a combination wire tool with a file, a wire for cleaning oil holes, and a blunt edge for gapping sparkplugs. The utility tool is distinguishable for its pivoting slide member with tools and encased tools.

Great Britain Patent Application No. 9237 published on Aug. 29, 1896, for Rudolph Teichmann describes a combination hand tool for cyclists comprising movable jaw driven by a screw attached to a grooved handle containing the pivoting tools. The accessory tools comprise a tire valve removal tool, a file and pricker combination, an air tire lifter, a spanner, a hexagonal wrench, and a hooked pin forcer. The combination hand tool is distinguishable for lacking a loop structure.

Sweden Patent Application No. 106,956 published on Mar. 23, 1943, for P. E. J. Larsen describes a combination hand tool comprising a pair of angled jaw pliers having a cutter region and a serrated crushing region in the jaws. The pivoting tools from the opposite in the grooved handle include a saw, a knife blade, and a combination flat head screwdriver, a can opener and a bottle cap opener. The tool is distinguishable for failing to have a loop structure.

There is a need in the art of mountaineering for tools which are effective for their intended use as well as being safe and handy. Moreover, none of the above patents, taken either singly or in combination, is seen to describe the instant invention as claimed.

SUMMARY OF THE INVENTION

According to the present invention, an improved carabiner and tool combination device comprises a body forming a portion of a loop and a gate completing the loop, wherein the body includes a folding knife. The folding knife comprises an elongated storage slot which is integral with the carabiner body. A knife blade is pivotally mounted at one end on a pivot pin to move between a blade open position outside the storage slot and a blade closed position within the storage slot. A gate is connected to the carabiner body and is hingewise pivoted between an open position and a closed position. The body and gate form a closed loop when the gate is in the closed position.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
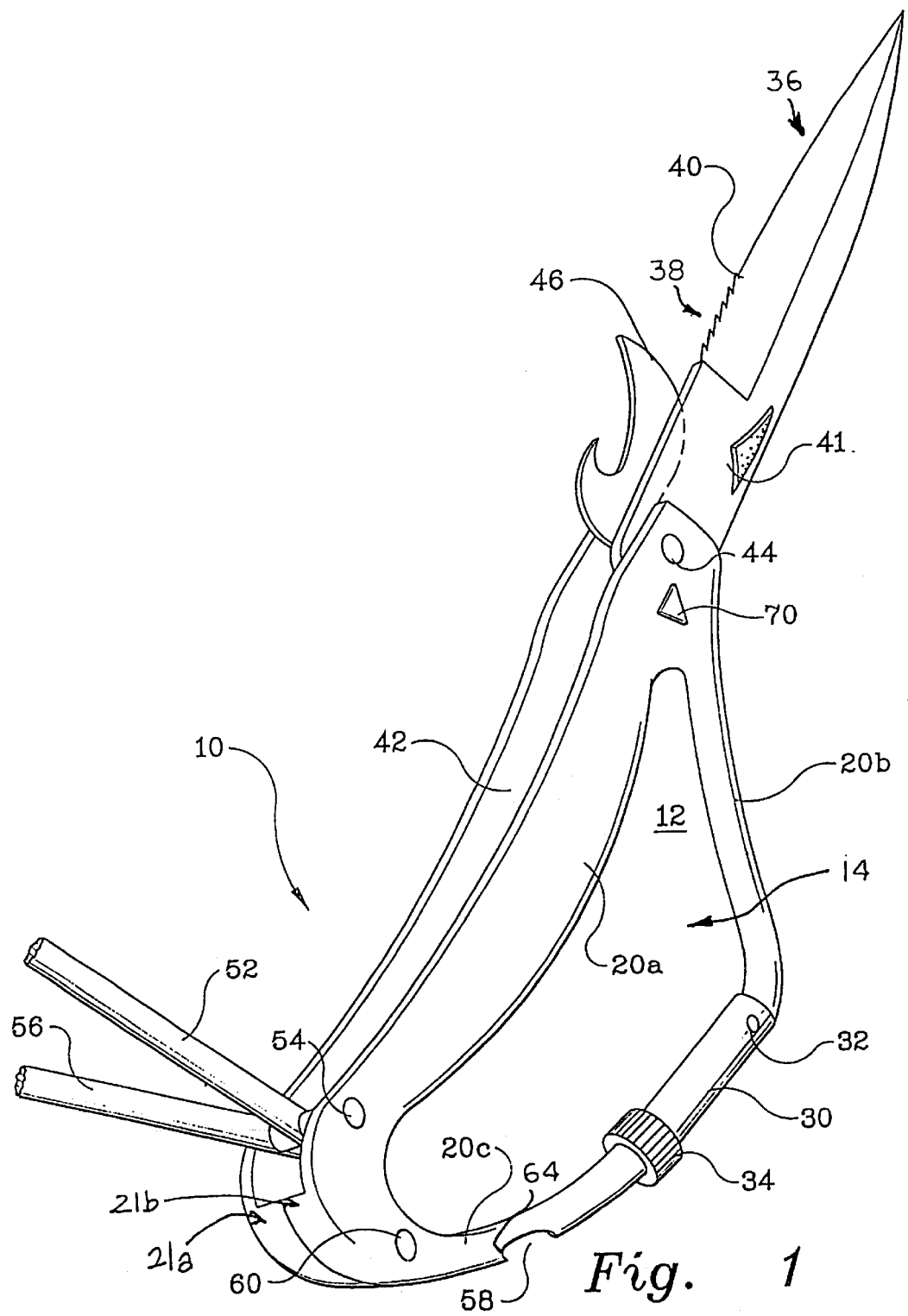
FIG. 1 is a perspective view of a carabiner with four tools, each in the open position.
Figure 2:
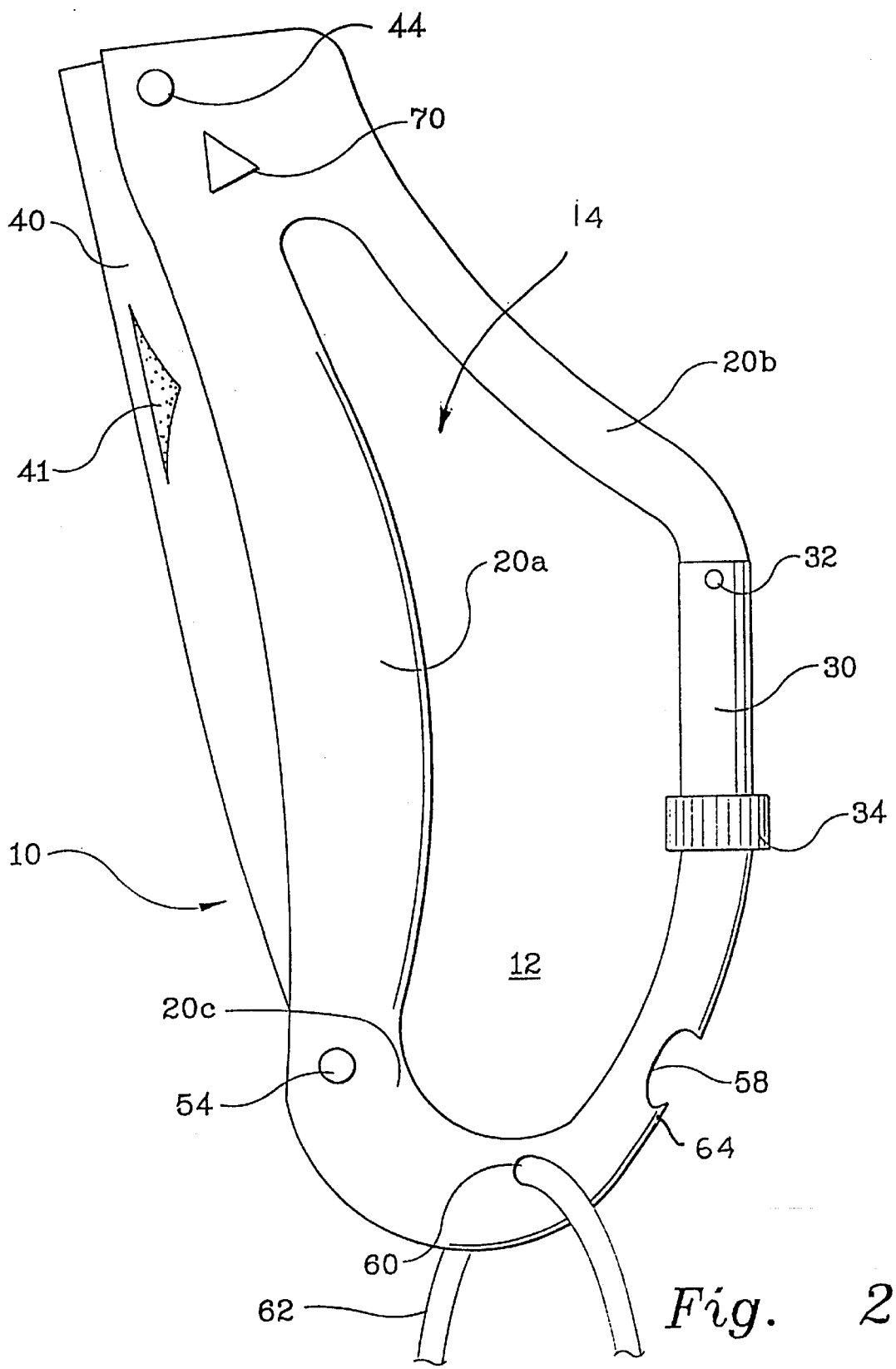
FIG. 2 is a side view of a carabiner in a closed tool position.

In FIGS. 1 and 2, a combination locking or nonlocking carabiner and tool device 10 is formed into a curvilinear prolate loop body circumscribing an opening 12, through which the fingers may pass. It should be noted that the device 10 can be grasped by either inserting the fingers through the opening 12 or around the entire device 10. The opening 12 is formed from the combination of a carabiner body 14 defined by handle 20a, upper arm 20b, lower arm 20c, and gate 30. Preferably, the body 14 is comprised of mating halves 21a and 21b, for ease of manufacturing and assembly, wherein a cavity may be formed for the accommodation of the tools and features as described below. Alternatively, the body 14 can be a unitary body.

Gate 30 is conventional and pivotally mounted on gate pivot pin 32 which is spring-loaded and swings between a gate closed position as illustrated in FIGS. 1 and 2 and a gate open position (not shown). Gate 30 is locked by rotating a knurled and internally threaded gate lock 34 in the closed gate position. Preferably, the arms 20b and 20c are ergonomically configured to include a prolapsed portion integrally formed by the gate 30. The prolapse is conformed to the fleshy portion of the palm of the hand below the thumb, thus permitting the carabiner to be comfortably held in the palm during its function as either a carabiner or the handle of an extended tool.

Within the carabiner body 14 is contained a folding knife comprising a handle 20a, a pivotally mounted knife blade 40, an elongated storage slot 42, and first pivot pin 44. Blade 40 pivots on first pivot pin 44 between an open blade position as shown in FIG. 1, and a closed blade position as depicted in FIG. 2. Knife blade 40 is ready as a cutting tool in the open blade position. In addition, the back of the blade 40 has a smooth portion 36 and a serrated sawing portion 38 to form a continuous profile with the prolapsed upper arm 20b of the carabiner body 14. In the closed blade position, blade 40 is safely contained in an elongated slot 42.

As is shown in FIG. 1 the device 10 can contain additional tools which are useful to a mountaineer and are particularly advantageous to have readily at hand. Can opener 46 is shown pivotally mounted on the first pivot pin 44. Knife blade 40 and can opener 46 pivot independently on a first pivot pin 44 inserted through apertures in both mating halves 21a and 21b of carabiner body 14.

Two additional optional tools are shown in FIG. 1. A generic tool 52 is shown pivotally mounted on second pivot pin 54, as is a generic tool 56. Each tool 52 and 56 pivots about a second pivot pin 54 between an open tool position as shown in FIG. 1 and a closed tool position shown in FIG. 2, in which they are contained in elongated slot 42. The width of elongated slot 42 is defined by the number and size of tools contained therein in the closed position. Tools 46, 52 and 56 can be selected from a group of tools which are useful to have at hand including a second knife blade, a bottle cap opener, a can opener, a saw, a flat head screw driver, a Phillips head screwdriver, an Allen wrench, a claw-shaped ripping hook tool, pliers, and scissors. In particular, the combination of a knife blade 40 and tool 46 selected as a can opener has been found to be useful. In another embodiment, the combination of a knife blade 40 and a tool 46 as a can opener with tool 52 and tool 56 selected as a flat head screwdriver and a Phillips head screw-driver has been found to be especially useful and handy.

Conventional Phillips-head screw- drivers have a crossed blade head in which each of the two crossed blades is identical. In an alternate configuration, one narrower or minor blade is combined with a larger or major blade to produce a Phillips head screwdriver having a flatter overall aspect. This type of Phillips head screwdriver fits particularly well into confined storage such as elongated storage slot 42, and is preferred in the combination carabiner device 10 shown in FIG. 1.

An additional tool is shown in FIG. 1. Bottle cap opener 58 is shown integral with lower loop 20a, and is generally defined as a notch with a sufficient lip 64 to act as a bottle opener. Bottle cap opener 58 provides an additional tool without the space limitation imposed by elongated slot 42. Bottle cap opener 58 is particularly handy because it does not require manual opening and is always readily at hand. Bottle cap opener 58 is also easily usable even when blade 40 or any one of tools 46, 52 and 56 is in the open position.

Also shown in FIG. 2 is aperture 60 in the lower arm 20c. Aperture 60 extends through lower arm 20c, and allows for the passage therethrough of suspension means 62 which is shown as a lanyard, but can be a key ring, key chain, leather lace, shoe lace, and the like useful means.

In FIG. 2, the combination carabiner and tool device 10 has two features which are configured for manipulation with the thumb of the right hand as an example. The features can be positioned on the opposite side of the tool for left-handed users. Attached to knife blade 40 is a thumb ridge 41 which assists in the movement of blade 40 from the blade closed position as shown in FIG. 2 to the blade open position shown in FIG. 1. Thumb ridge 41 is made of solid rubber or a polymer, and has a surface having a coefficient of friction which is easily engaged by the thumb even when wet with perspiration, slime and mud, and coated with dust or a glove. Thumb ridge 41 can be attached to a flat blade surface or for better adhesion, can fill a shallow pocket in the blade surface and extend above the surface as shown for maximum frictional contact with the thumb. The size of thumb ridge 41 is not critical, but it must be small enough not to interfere with the use of the knife and carabiner. Alternatively, thumb ridge 41 can overlap the back edge of the knife blade 40 to afford the versatility for either right- or left-handed persons.

Also shown in FIG. 2 is a triangular lock release button 70 which is manually operated by the thumb of the right hand. The triangular shape is exemplary as any shape which can be tactilely felt to aid in locating the geometrically different shaped button even in the dark. Alternatively, the lock release button 70 can be positioned on the opposite side for the convenience of left-handed users.

Figure 3:
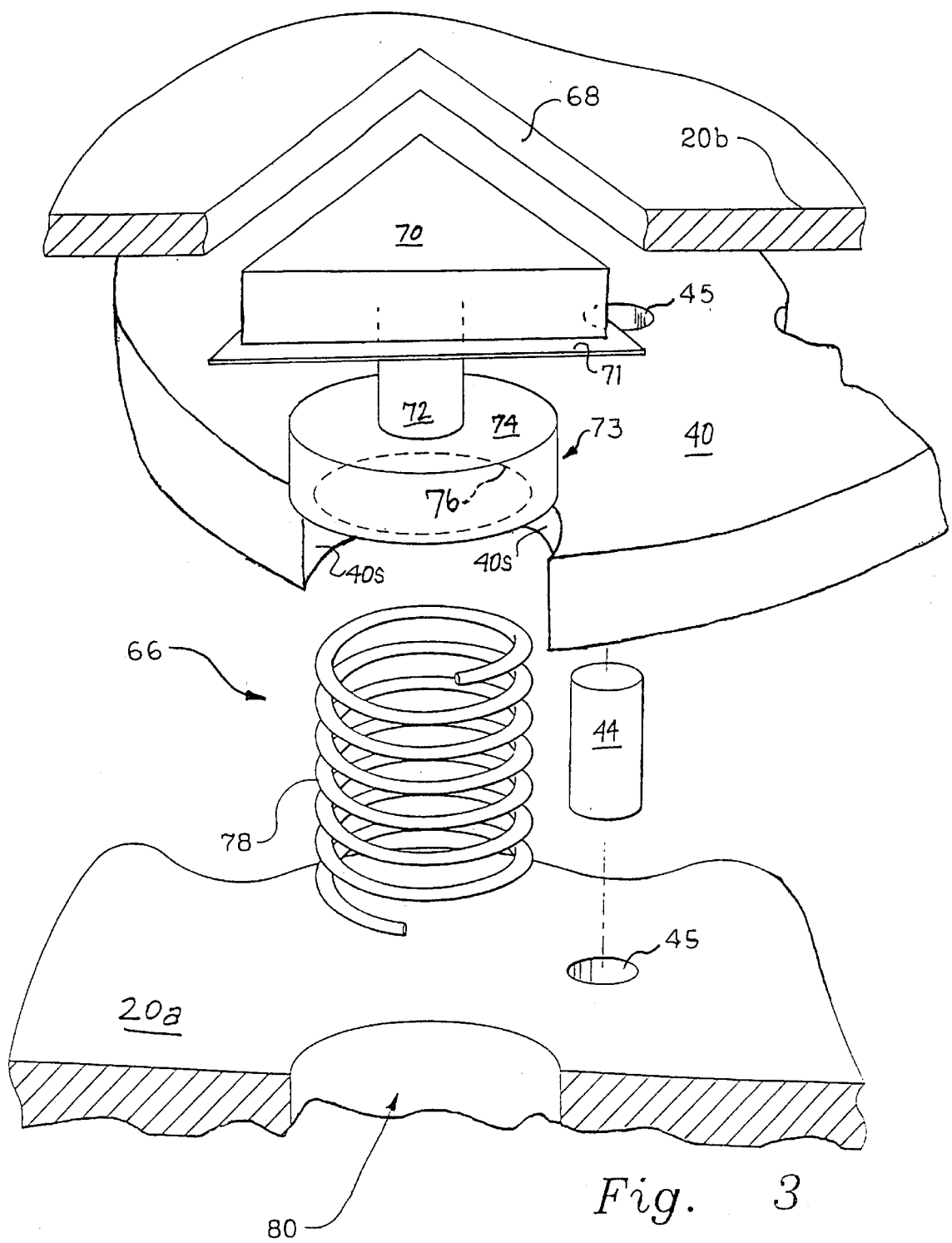
FIG. 3 is a an exploded view of the knife-blade locking pin assembly.

In FIG. 3, an exploded view of an exemplary locking pin assembly 66 of the invention is illustrated. Lock release button 70 is shown to protrude through a triangular slot 68 in the upper arm 20b so that it is readily accessible to the right thumb. Retaining means 71 holds the lock release button 70 within the body. In this situation, retaining means 71 is a flange unitary with lock release button 70. Alternatively, retaining means 71 can be a collar, split ring, pin, tab or the like for accomplishing this purpose. Lock release button 70 is attached to an elongated shaft 73 formed of two parts, a lesser diameter shaft 72 and greater diameter shaft 74. In this preferred example, the lock release button 70 and the elongated shaft 73 are a unitary piece formed from a single piece of metal. In the alternative, they can be formed separately and assembled by welding.

Within the lower end of greater diameter shaft 74 is spring cavity 76 which holds coiled spring 78. Coiled spring 78 urges the locking pin assembly 66 against the undersurface of upper arm 20a. The locking pin assembly 66 is entirely contained in pin assembly cavity 80, the lower end of which cavity is a surface within the body of upper arm 20a.

The function of locking pin assembly 66 is to releasably lock blade 40 into the open blade position. In the open blade position, the greater diameter shaft 74 has a cross-sectional area sufficient to substantially fill arcuate slot 40s in blade 40. The greater diameter shaft 74, being held in an offset but coplanar arrangement by the surface of blade 40 during closed and semi-open angular positions of blade 40, is forced upward by spring 78 as the slot 40s passes directly overhead, thus permitting shaft 74 to align in the same plane as knife blade 40. As a result, blade 40 is prevented from further rotational movement and is restrained from pivoting about the first pivot pin 44.

The locking pin assembly 66 provides releasable locking of blade 40. When the lock is to be released, the lock release button 70 is manually pushed in, forcing the greater diameter shaft 74 downward, and freeing greater diameter shaft 74 from slot 40s in blade 40. As a result, blade 40 is free to pivot about the first pivot pin 44 from an open blade position to a closed blade position inside elongated slot 42. Alternatively, by placing an outwardly biasing coil spring 78 about lesser diameter shaft 72, the same purpose can be achieved.

Conventional locking knife assemblies such as liner locks, liner locks with slide button actuators and lockbacks can be employed in the present invention.

Materials of construction for the combination carabiner and tool device of the invention can be stainless steel or high quality alloy steel known for impact resistance and for being able to be machined to close tolerances. A manufacturer can also use metals in combination with plastic materials and other conventional materials of construction. Hence, it is to be understood that the present invention is not limited to the sole embodiments described above, but encompasses any and all embodiments within the scope of the following claims.

What is claimed is:

1. A combination carabiner and tool device comprising:
   a curvilinear body having an elongated handle member with a first end and a second end, an upper arm member integrally attached at the first end, and a lower arm member integrally attached to the second end of said handle member;
   an elongated storage slot disposed within the handle member;
   a knife blade pivotally mounted at the first end of the handle member, said blade pivoting between an extended open position outside the storage slot and a closed position within the storage slot; and
   a gate element connecting said upper arm member and said lower arm member, said gate element being pivotally mounted to move between an open position and a closed position, wherein the curvilinear body and gate element define a prolate opening when the gate element is in the closed position.

2. The combination carabiner and tool device according to claim 1, including a locking pin assembly for releasably locking said knife blade in the open position.

3. The combination carabiner and tool device according to claim 2, said locking pin assembly comprises:
   a head which protrudes through a slot in the body and contacts an elongated shaft;
   the elongated shaft formed of a lesser diameter shaft portion and a greater diameter shaft portion;
   the greater diameter shaft portion having a cross-sectional area sufficient to substantially fill an arcuate slot in the blade; and
   a coil spring in contact at a first end with the elongated shaft and at a second end with the body.

4. The combination carabiner and tool device according to claim 1, wherein said knife blade has a projecting thumb ridge to facilitate in manipulating the knife blade between the open position and the closed position.

5. The combination carabiner and tool device according to claim 4, wherein the projecting thumb ridge overlaps the back edge of the knife for enabling use by either a right- or left-handed person.

6. The combination carabiner and tool device according to claim 1, including a folding can opener pivotally mounted at the first end of the handle member adjacent said knife blade.

7. The combination carabiner and tool device according to claim 1, including an external cutout with a lip in the lower arm member for opening capped bottles.

8. The combination carabiner and tool device according to claim 1, said gate element includes means for locking the gate element in the closed position.

9. The combination carabiner and tool device according to claim 1, including at least one tool pivotally mounted at the second end of the handle member, said at least one tool pivoting between an extended open position outside the storage slot and a closed position within the storage slot.

10. The combination carabiner and tool device according to claim 9, wherein said at least one tool is selected from the group consisting of a knife blade, a can open, a bottle cap opener, a Phillips screwdriver, a flat head screwdriver, a saw, an Allen wrench, a pair of scissors, a claw-shaped ripping hook tool, a pair of pliers, and combinations thereof.

* * * * *

(12) EX PARTE REEXAMINATION CERTIFICATE (8821st)
United States Patent
Barber

(10) Number: US 6,223,372 C1
(45) Certificate Issued: Jan. 24, 2012

(54) COMBINATION CARABINER AND TOOL DEVICE

(75) Inventor: Launce R. Barber, Vienna, VA (US)

(73) Assignee: Elemental Tools, LLC, Vienna, VA (US)

Reexamination Request:
No. 90/009,875, Mar. 17, 2011

Reexamination Certificate for:
Patent No.: 6,223,372
Issued: May 1, 2001
Appl. No.: 09/365,747
Filed: Aug. 3, 1999

Related U.S. Application Data

(60) Provisional application No. 60/095,842, filed on Aug. 7, 1998.

(51) Int. Cl.
*B25B 11/00* (2006.01)
*B26B 11/00* (2006.01)

(52) U.S. Cl. .................... 7/118; 7/158; 24/582.11
(58) Field of Classification Search .................. None
See application file for complete search history.

(56) References Cited

To view the complete listing of prior art documents cited during the proceeding for Reexamination Control Number 90/009,875, please refer to the USPTO's public Patent Application Information Retrieval (PAIR) system under the Display References tab.

*Primary Examiner* — Glenn K. Dawson

(57) ABSTRACT

A combination carabiner and tool device comprises a curvilinear handle and a lockable gate to form a loop. In the handle is a folding knife and additional useful tools at both ends. A push button lock releasably holds the knife blade in the blade open position. The knife blade is pivoted into position and releasbly locked by manipulation with the user's thumb.

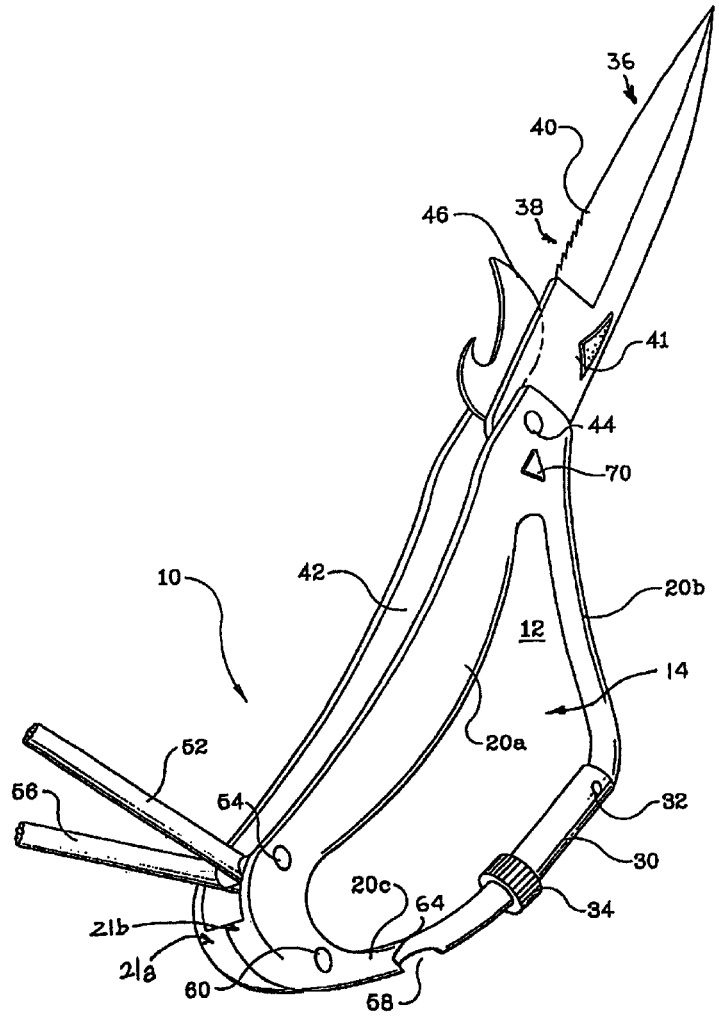

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-10 is confirmed.

New claims 11-15 are added and determined to be patentable.

*11. The combination carabiner and tool device according to claim 1, wherein the upper and lower arms are ergonomically configured to include a prolapsed portion integrally formed by the gate.*

*12. The combination carabiner and tool device according to claim 11, wherein the prolapsed portion is in a shape conforming to the fleshy portion of the palm of a user's hand below the thumb.*

*13. The combination carabiner and tool device according to claim 1, wherein the knife blade has a smooth portion and a serrated sawing portion, and forms a continuous profile with the upper arm of the curvilinear body.*

*14. The combination carabiner and tool device according to claim 1, wherein the knife blade is attached to a second knife blade.*

*15. The combination carabiner and tool device according to claim 1, wherein the knife blade is attached to a pair of scissors.*

* * * * *